United States Patent [19]

Kriessmann et al.

[11] Patent Number: 4,992,525

[45] Date of Patent: Feb. 12, 1991

[54] DIESTER OF PHOSPHORIC ACID AND MONOEPOXIDE REACTED WITH EPOXIDE TO FORM PRODUCT REACTED WITH MONOISOCYANATE

[75] Inventors: Ingo Kriessmann; Willibald Paar, both of Graz, Austria

[73] Assignee: Vianova Kunstharz, A.G., Werndorf, Austria

[21] Appl. No.: 187,427

[22] Filed: Apr. 28, 1988

[30] Foreign Application Priority Data

Apr. 28, 1987 [AT] Austria ................................ 1049/87

[51] Int. Cl.$^5$ ..................... C08G 59/14; C08G 63/66; C08G 18/58; C08G 79/04
[52] U.S. Cl. .................................. 528/103; 528/108; 528/398; 523/414; 523/415; 523/417; 524/612; 525/528
[58] Field of Search ................ 525/528; 523/410, 415, 523/416, 417, 414; 524/612; 528/103, 108, 398

[56] References Cited

U.S. PATENT DOCUMENTS

| | | | |
|---|---|---|---|
| 2,849,418 | 8/1958 | Fang | 528/398 |
| 3,245,940 | 4/1966 | Ronay et al. | 528/108 |
| 3,281,502 | 10/1966 | Pelletier et al. | 528/398 |
| 4,256,844 | 3/1981 | Martin et al. | 528/108 |
| 4,299,747 | 11/1981 | Birkmeyer | 523/414 |
| 4,425,451 | 1/1984 | Sekmakas et al. | 523/414 |
| 4,452,929 | 6/1984 | Powers et al. | 528/108 |

FOREIGN PATENT DOCUMENTS

WO83/00045 1/1983 PCT Int'l Appl. ................ 523/414

*Primary Examiner*—John C. Bleutge
*Assistant Examiner*—Robert E. L. Sellers, II
*Attorney, Agent, or Firm*—A. W. Breiner

[57] ABSTRACT

Cationic resins based on epoxy resins which are modified through the introduction of phosphoric acid segments and the process of producing the resins are described. The reaction of the phosphoric acid is carried out in a multiple-step process whereby, in a first step, the diester is formed through reaction of ortho-phosphoric acid with 2 moles of a monoepoxy compound or through reaction of a polyphosphoric acid with $n-1$ moles of a monoalcohol and subsequent reaction with $n+1$ moles of a monoepoxy compound. The remaining acid group is reacted with a di- or polyepoxy resin. The products obtained can still contain unreacted epoxy groups. The protonable groups are introduced via the epoxy groups and/or via the hydroxy groups present or set free by opening of the oxirane ring. The binders can be combined with hardening components or may be formulated as self-crosslinking binders. The binders have excellent resistance to corrosion when stoved as electrodeposited coatings.

12 Claims, No Drawings

DIESTER OF PHOSPHORIC ACID AND MONOEPOXIDE REACTED WITH EPOXIDE TO FORM PRODUCT REACTED WITH MONOISOCYANATE

FIELD OF INVENTION

This invention relates to cationic resins based on epoxy resins which are modified through the introduction of phosphoric acid segments and to a process for producing the resins.

BACKGROUND OF INVENTION

Phosphoric acid is used according to the art to protonate cationic resins primarily for use as or in cathodically depositable paint binders. See, for example, U.S. Pat. No. 4,304,703, DE-OS No. 22 65 195, U.S. Pat. No. 3,954,588, or DE-OS No. 27 53 595. In all of the aforesaid disclosures the phosphoric acid is set free through discharge on electrodeposition. In the prior art, epoxy resins modified with phosphoric acid were characterized by a content of free acid groups whereby the resins could be rendered water-soluble through salt formation with bases. It is evident that such resins are not suitable for the use in cationic resins.

GENERAL DESCRIPTION OF INVENTION

It has now been found that cationic resins containing as the starting material epoxy resins partially modified with phosphoric acid and not carrying free acid groups exhibit favorable properties, in particular when used as cathodically depositable paint binders.

Accordingly, the present invention is directed to cationic resins, water-dilutable upon protonation, based on phosphoric acid modified epoxy resins, characterized in that (A1) 1 mole ortho-phosphoric acid is reacted with 2 moles of a monoepoxy compound, or (A2) 1 mole of a polyphosphoric acid with n P-atoms is reacted with n−1 moles of a monoalcohol with at least 4 C-atoms and, subsequently, with n+1 moles of a monoepoxy compound, and (B) the obtained diesters of A1 and A2 are reacted at about 60° C. to 130° C. with at least one oxirane group of a mono- or polyepoxy compound to an acid value of below 5 mg KOH/g, preferably below 3 mg KOH/g, and (C) the oxirane groups present are transformed to amine adducts with primary and/or secondary amines or to quaternary ammonium salts with tertiary amine-acid blends and/or the groups required for protonation or crosslinking are introduced in known manner through reaction of the free hydroxy groups or hydroxy groups set free by opening the oxirane ring with basic and/or unsaturated monoisocyanates.

Polyepoxy compound includes the diepoxy compound.

The invention is further concerned with the process of producing the cationic resins and to the use of the cationic resins of the invention as binders for cathodically depositable paints.

The process of producing the cationic resins of this invention is a multiple-step process whereby, in the case of ortho-phosphoric acid, the phosphoric acid diester is obtained through reaction with monoepoxy compounds, such as alkylene oxides, alkylglycidyl ethers, or alkylglycidyl esters. The preferred monoepoxy compounds are the glycidylesters of tertiary monocarboxylic acids, commonly referred to as KOCH-acids. The reaction is effected, preferably in the presence of an aprotic solvent such as diethyleneglycol dimethylether or N-methylpyrrolidone, through addition of the monoepoxy compound at 30° C. to 60° C. and through reaction at 60° C. to 80° C., until the calculated acid value has been attained. Advantageously, the water contained in the available 85% phosphoric acid is bonded to phosphoric acid with a corresponding quantity of phosphor pentoxide.

When using polyphosphoric acids with an average of 3 to 5 phosphoric acid units it is possible to carry out an esterification reaction with monoalcohols with 4 or more carbon atoms as the first step. This reaction is carried out at 30° C. to 70° C., preferably in the presence of an inert solvent. The portion of free ortho-phosphoric acid which is thereby formed is reacted to form a diester with the monoepoxy compound, jointly with the monoester, in order that the diester contains, with n phosphorusatoms in the polyphosphoric acid, n−1 moles monoalcohol and n+1 moles monoepoxy compound.

The remaining acid groups are then esterified at 60° C. to 130° C. with a mono- or polyepoxy compound to an acid value of below 5 mg KOH/g, preferably below 3 mg KOH/g. The weight ratios are chosen in order that at least one epoxy group of the epoxy compound is esterified. The product resulting from this reaction may still carry epoxy groups suitable for further reactions. However, all epoxy groups may be reacted with the phosphoric acid diesters; in such case, for further reactions the hydroxy groups set free on the opening of the epoxy groups or already present in the epoxy resin can be used.

The suitable monoepoxy compounds for this latter step are the monoglycidylesters or monoglycidylethers noted above. The di- or polyglycidyl compounds, for example, based on polyalkylene glycols, diene polymers, or phenol novolaks used in this step are known to one skilled in the art and available on the market in a great variety.

Surprisingly, the products resulting from this stepwise reaction show greater uniformity; their oxirane groups can be transformed in known manner to epoxy-amine adducts through reaction with primary and/or secondary amines or to quaternary ammonium salts through reaction with tertiary amine-acid blends. Basic or unsaturated monoisocyanate groups necessary for protonation or crosslinking can be introduced through reaction of the free hydroxy groups, or the hydroxy groups set free through other reactions with the oxirane groups in known manner. Monoisocyanates used to advantage are semi-blocked diisocyanates carrying, for example, an N,N-dialkanolamine or a hydroxyalkyl(-meth)acrylate as the blocking agent. The chain may also be extended via the oxirane and hydroxy groups with the aid of dicarboxylic compounds, diamines, acid anhydrides, or polyisocyanate compounds.

It has been shown that through the introduction of phosphoric acid segments according to the present invention, the adhesion of the paints to a substrate and the adhesion of the following coat can be substantially improved. These groupings also have a catalytic effect on the crosslinking reactions through transurethanation or transesterification. Additionally, such groupings enhance the corrosion resistance of the paint films.

PRESENTLY PREFERRED EMBODIMENTS OF INVENTION

The following examples illustrate the invention without limiting its scope. Parts and percentages refer to weight, unless otherwise stated.

EXAMPLE 1

(a) Preparation Of The Phosphoric Acid Modified Epoxy Resin 84 parts polyphosphoric acid corresponding to about 3 hydrogen equivalents are slowly added, while cooling and stirring, to 130 parts 2-ethylhexanol and esterified at 30° C. to 40° C. to an acid value which corresponds to a blend of 75% of a monoester and 25% of free orthophosphoric acid. The quantity of ethylhexanol (1 mole) is consumed to 75% through esterification, the remaining 25% serving as solvent.

With further cooling, 233 parts 2-ethylhexylglycidylether (1.25 moles) are added to the reaction product within 30 minutes. The temperature is slowly raised to about 40° C. and, after the exotherm has subsided, it is raised to 70° C. and held until the acid value corresponding to the diester has been attained.

50 parts of the thus produced reaction product are dissolved in 133 parts diethyleneglycol dimethylether and, after addition of 238 parts of a diepoxy resin based on bisphenol A and epichlorohydrin having an epoxy equivalent weight (EEW) of about 475 are reacted at 70° C. to 100° C. to an acid value of below 5 mg KOH/g. The product has an EEW of about 1300 and can be processed further in known manner.

(b) Preparation Of The Cationic Resin

The obtained resin solution of (a) above is cooled to 70° C. and 16 parts diethylaminopropylamine and 14 parts diethanolamine are added and reacted at 70° C. to an epoxy resin value of zero.

(c) Preparation And Evaluation Of A Clear Varnish 75 parts of resin solids of (b) above are homogenized at 80° C. to 90° C. for 2 hours with 25 parts of a hardening component based on malonic acid esters according to the procedure described in U.S. Pat. No. 4,523,007 and blended with lead octoate, corresponding to 1% Pb based on resin solids. After neutralization with 45 millimoles formic acid per 100 g resin solids, the batch is diluted to a solids content of 15%. Untreated steel panels, cathodically electrocoated and stoved for 30 minutes at 160° C., show practically no attack after exposure to salt spray for 800 hours.

EXAMPLE 2

(a) Preparation Of The Phosphoric Acid Modified Epoxy Resin 63 parts of an 85% aqueous solution of ortho-phosphoric acid are reacted with 35 parts phosphoruspentoxide to 98 parts of 100% ortho-phosphoric acid (1 mole). Then, at 30° C. to 40° C., 500 parts of a glycidylester of a tert. $C_9$-$C_{11}$-monocarboxylic acid (2 moles) are added and reacted to the theoretical acid value of the phosphoric acid diester (281 mg KOH/g).

After addition of 475 parts of an epoxy resin based on bisphenol A and epichlorohydrin having an EEW of about 475 (0.5 moles) to 460 parts diethyleneglycol dimethylether, esterification, at 90° C., is carried to an acid value of below 5 mg KOH/g. The product has practically no free epoxy groups.

(b) Preparation Of A Cationic Resin

While cooling the solution obtained in (a) above, at 50° C., is continuously blended in drops with 582 of a toluylene diisocyanate, semi-blocked with diethylethanolamine, dissolved in 249 parts diethyleneglycol dimethylether. At the end of the addition and when the exotherm has subsided, the temperature is raised to 70° C. to 80° C. and held until the NCO-value has fallen to zero.

(c) Preparation And Evaluation Of A Clear Varnish Of The Self-crosslinking Binder A binder solution corresponding to 100 g resin solids is mixed with 5.6 parts dibutyltinlaurate, and, upon neutralization with 50 millimoles formic acid per 100 g resin solids, is diluted with water to a solids content of 15%. Zinc-phosphated steel panels are coated with the clear varnish and stoved at 160° C. for 25 minutes. After 1200 hours of salt spray exposure, the coatings show practically no attack.

As will be apparent to one skilled in the art, various modifications can be made within the scope of the aforesaid description. Such modifications being within the ability of one skilled in the art form a part of the present invention and are embraced by the appended claims.

It is claimed is:

1. Process for producing cationic resins, water-dilutable upon protonation, based on phosphoric acid modified epoxy resins, characterized in that
   (A1) 1 mole ortho-phosphoric acid is reacted with 2 moles of a monoepoxy compound, or
   (A2) 1 mole of a polyphosphoric acid with n phosphorus atoms is reacted with n−1 moles of a monoalcohol with at least 4 carbon atoms and, subsequently, with n+1 moles of a monoepoxy compound, and
   (B) the diesters obtained in A1 or A2 are reacted at about 60° C. to 130° C. with at least one oxirane group of a mono- or polyepoxy compound to an acid value of below 5 mg KOH/g; and
   (c) any oxirane groups present after (B) above are further reacted with primary or secondary amines or with tertiary amine-acid blends or the hydroxyl groups present after (B) are reacted with basic or unsaturated monoisocyanates to provide a phosphoric acid modified epoxy resin which is, upon protonation, diluted with water.

2. The process according to claim 1 wherein in step (B) the diesters are reacted to an acid value of below 3 mg KOH/g.

3. The process according to claim 1 wherein any oxirane groups present after (B) are reacted with primary or secondary amines to provide an amine adduct.

4. The process according to claim 1 wherein any oxirane groups present after (B) are reacted with tertiary amine-acid blends to provide quaternary ammonium salts.

5. The process according to claim 1 wherein hydroxy groups present after (B) are reacted with basic monoisocyanates.

6. The process according to claim 1 wherein after (B) the reaction product is reacted with unsaturated monoisocyanates to provide a crosslinking capability to the cationic resins.

7. The process according to claim 1 wherein the monoepoxy compound is an alkylene oxide, an alkylglycidylether, or an alkylglycidylester.

8. The process according to claim 7 wherein the alkylglycidylester is a glycidylester of tertiary monocarboxylic acids with 9 to 11 carbon atoms.

9. The process according to claim 1 wherein the polyepoxy compound of (B) are based on bisphenol A and epichlorohydrin.

10. The process according to claim 1 wherein the polyepoxy compound of (B) are based on phenol-novolaks.

11. The cationic resins produced by the process of any one of claims 1–6 or 7–10.

12. Cathodic deposition paints containing binders including the cationic resins produced by the process of any one of claims 1–6 or 7–10.

* * * * *